US012711128B2

(12) United States Patent
Zogg et al.

(10) Patent No.: US 12,711,128 B2
(45) **Date of Patent: *Aug. 18, 2026**

(54) SYSTEMS AND METHODS FOR AUTOMATED DISCOVERY AND TRACKING OF A MIGRATION OF LEGACY NETWORKED RESOURCES WITHIN AN ENTERPRISE

(71) Applicant: STATE FARM MUTUAL AUTOMOBILE INSURANCE COMPANY, Bloomington, IL (US)

(72) Inventors: Jason Zogg, Bloomington, IL (US); Lakshmi Devi Boreddy, Bloomington, IL (US); D. Michael George, Hopedale, IL (US); Krishnamurthi Ramasamy, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,136

(22) Filed: Feb. 21, 2025

(65) Prior Publication Data

US 2025/0190429 A1 Jun. 12, 2025

Related U.S. Application Data

(63) Continuation of application No. 16/743,835, filed on Jan. 15, 2020, now Pat. No. 12,242,471.

(51) Int. Cl.
*G06F 16/242* (2019.01)
*G06F 16/21* (2019.01)
(Continued)

(52) U.S. Cl.
CPC ........ *G06F 16/2425* (2019.01); *G06F 16/214* (2019.01); *G06F 16/2365* (2019.01); *G06F 16/252* (2019.01); *G06N 5/04* (2013.01)

(58) Field of Classification Search
CPC ............... G06F 16/2425; G06F 16/214; G06F 16/2365; G06F 16/252; G06N 5/04
See application file for complete search history.

(56) References Cited

U.S. PATENT DOCUMENTS 8,893,118 B2 11/2014 Guminy et al.
9,098,364 B2 8/2015 Davis
(Continued)

FOREIGN PATENT DOCUMENTS

CN 104252502 A 12/2014
CN 104408085 A 3/2015
CN 107992512 A 5/2018

OTHER PUBLICATIONS

Datadobi, "DobiMiner White Paper—NAS Storage Platform Migration", Retrieved from the Internet at: <URL: https://datadobi.com/whitepapers/DobiMigrate_Whitepaper.pdf> (2018).
(Continued)

*Primary Examiner* — Courtney Harmon
(74) *Attorney, Agent, or Firm* — MARSHALL, GERSTEIN & BORUN LLP

(57) ABSTRACT

Automated migration systems and methods are described for discovering and tracking a migration of legacy networked resources within a computer network environment. A network resource discovery application (app) implemented on a migration server executes, during an active migration session, a predefined migration query selected from one or more predefined migration queries customized based on corresponding migration types. The predefined migration query discovers a set of network dependencies of a legacy networked resource, corresponding to a migration type, and
(Continued)

accessible on a computer network comprising a plurality of online network resources. The resource discovery app loads dependency data representative of the discovered set of network dependencies into a migration database according to the migration schema format, and predicts a migration plan for a target migration network resource to be implemented on the computer network at a future time, where the target migration network resource will require access to the dependency data.

20 Claims, 10 Drawing Sheets

(51) Int. Cl.

*G06F 16/23* (2019.01)
*G06F 16/25* (2019.01)
*G06N 5/04* (2023.01)

(56) References Cited

U.S. PATENT DOCUMENTS

| | | | | |
|---|---|---|---|---|
| 9,282,166 | B2 | 3/2016 | Markley et al. | |
| 9,875,276 | B2 | 1/2018 | Golec et al. | |
| 9,996,562 | B2 | 6/2018 | Higginson et al. | |
| 10,248,671 | B2 | 4/2019 | Buehne et al. | |
| 10,311,078 | B2 | 6/2019 | Bryan et al. | |
| 11,422,986 | B1 | 8/2022 | Waas et al. | |
| 11,615,061 | B1 * | 3/2023 | Malik | G06F 16/214 707/602 |
| 12,242,471 | B1 | 3/2025 | Zogg et al. | |
| 2016/0036724 | A1 | 2/2016 | Syed et al. | |
| 2016/0179850 | A1 * | 6/2016 | Martin | G06F 16/278 707/634 |
| 2017/0373933 | A1 * | 12/2017 | Subramanian | G06F 16/24578 |
| 2019/0108223 | A1 * | 4/2019 | Fabijancic | G06F 8/30 |
| 2019/0235895 | A1 | 8/2019 | Ovesea et al. | |
| 2019/0288915 | A1 * | 9/2019 | Denyer | G06F 16/252 |
| 2020/0125404 | A1 * | 4/2020 | Klein | G06F 9/5027 |
| 2021/0081379 | A1 | 3/2021 | Buehne et al. | |

OTHER PUBLICATIONS

Hwang et al., "Automation and orchestration framework for large-scale enterprise cloud migration", IBM Journal of Research and Development, 60(2-3), 1-12 (2016).

* cited by examiner

Figure 2A:
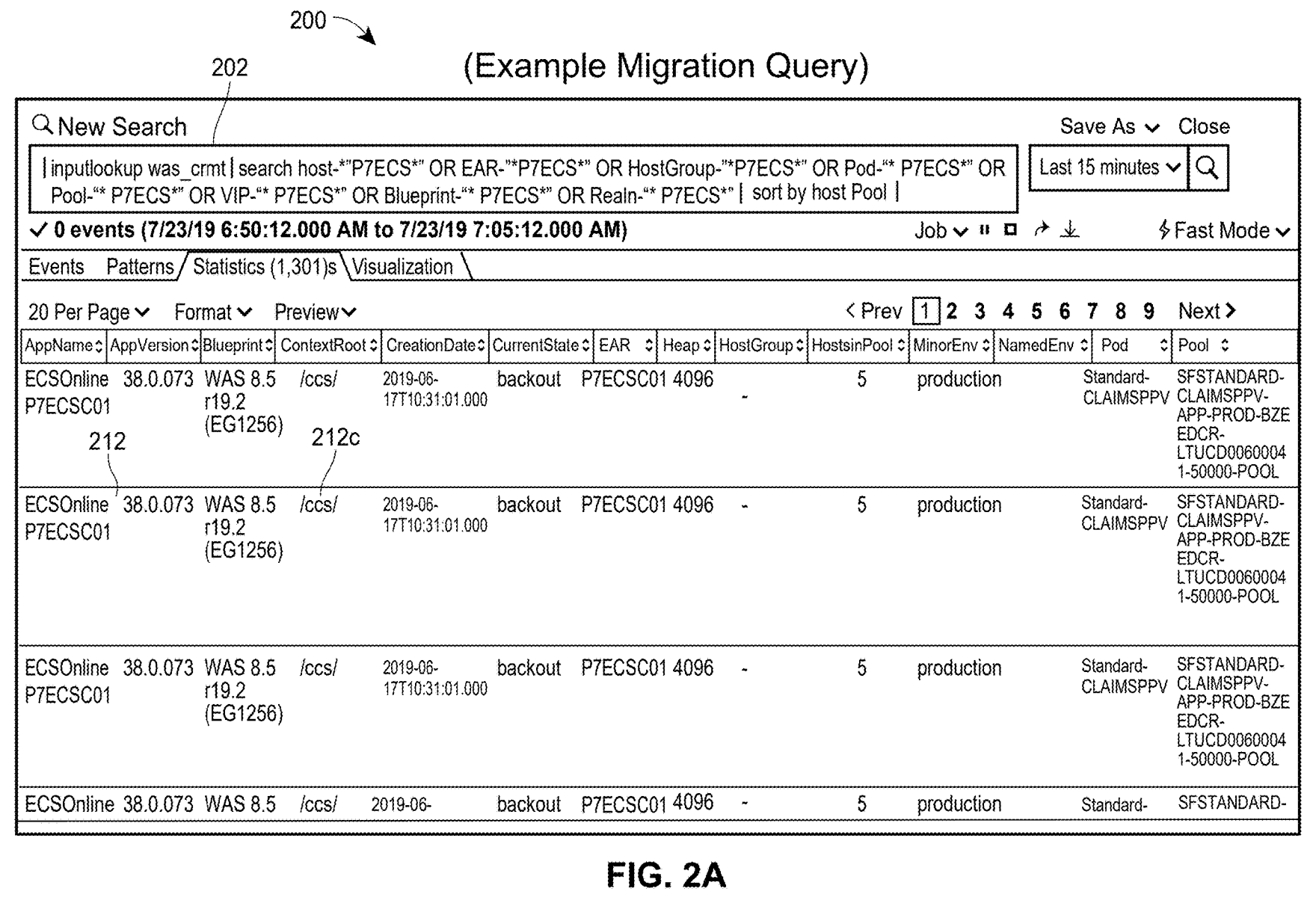

200

(Example Migration Query)

202

New Search

Save As Close

| inputlookup was_crmt | search host-*"P7ECS*" OR EAR-"*P7ECS*" OR HostGroup-"*P7ECS*" OR Pod-"* P7ECS*" OR Pool-"* P7ECS*" OR VIP-"* P7ECS*" OR Blueprint-"* P7ECS*" OR Realn-"* P7ECS*" | sort by host Pool |

Last 15 minutes

0 events (7/23/19 6:50:12.000 AM to 7/23/19 7:05:12.000 AM)

Job Fast Mode

Events Patterns Statistics (1,301)s Visualization

20 Per Page Format Preview

< Prev 1 2 3 4 5 6 7 8 9 Next >

| AppName | AppVersion | Blueprint | ContextRoot | CreationDate | CurrentState | EAR | Heap | HostGroup | HostsinPool | MinorEnv | NamedEnv | Pod | Pool |
|---|---|---|---|---|---|---|---|---|---|---|---|---|---|
| ECSOnline P7ECSC01 | 38.0.073 | WAS 8.5 r19.2 (EG1256) | /ccs/ | 2019-06-17T10:31:01.000 | backout | P7ECSC01 | 4096 | - | 5 | production | | Standard-CLAIMSPPV | SFSTANDARD-CLAIMSPPV-APP-PROD-BZEEDCR-LTUCD00600041-50000-POOL |
| ECSOnline P7ECSC01 | 38.0.073 | WAS 8.5 r19.2 (EG1256) | /ccs/ | 2019-06-17T10:31:01.000 | backout | P7ECSC01 | 4096 | - | 5 | production | | Standard-CLAIMSPPV | SFSTANDARD-CLAIMSPPV-APP-PROD-BZEEDCR-LTUCD00600041-50000-POOL |
| ECSOnline P7ECSC01 | 38.0.073 | WAS 8.5 r19.2 (EG1256) | /ccs/ | 2019-06-17T10:31:01.000 | backout | P7ECSC01 | 4096 | - | 5 | production | | Standard-CLAIMSPPV | SFSTANDARD-CLAIMSPPV-APP-PROD-BZEEDCR-LTUCD00600041-50000-POOL |
| ECSOnline | 38.0.073 | WAS 8.5 | /ccs/ | 2019-06- | backout | P7ECSC01 | 4096 | - | 5 | production | | Standard- | SFSTANDARD- |

(Resource Dependencies - Database)

| ear ⇕ | db_host ⇕ | db_name ⇕ | db_name ⇕ | db_port ⇕ | db_type ⇕ |
|---|---|---|---|---|---|
| P7ECSC01 | E21IBMVIPA1.OPR.STATEFARM.ORG | | 58 | 3160 | IMS |
| **P7ECSC01** | E26IBMVIPA1.OPR.STATEFARM.ORG | | 58 | 3160 | IMS |
| P7ECSC01 | EP5IBMVIPA.OPR.STATEFARM.ORG | | 58 | 3160 | IMS |
| P7ECSC01 | SQLPSSSS1.OPR.STATEFARM.ORG | SFSQL_SESSIONSTATE | 8 | 1433 | SQL |
| P7ECSC01 | E20IBMVIPA1.OPR.STATEFARM.ORG | | 58 | 3160 | IMS |
| P7ECSC01 | E11IBMVIPA1.OPR.STATEFARM.ORG | | 58 | 3160 | IMS |
| P7ECSC01 | E09IBMVIPA1.OP.STATEFARM.ORG | | 58 | 3160 | IMS |
| P7ECSC01 | E17IBMVIPA1.OPR.STATEFARM.ORG | | 58 | 3160 | IMS |
| P7ECSC01 | E01IBMVIPA1.OPR.STATEFARM.ORG | | 58 | 3160 | IMS |
| P7ECSC01 | E05IBMVIPA1.OPR.STATEFARM.ORG | | 58 | 3160 | IMS |

(Resource Dependencies - Mainframe)

| protocol | Ear | local_location | local_os | conn_type | remote_location | remote_prefix_desc | remote_server_type | remote_os | conn_count |
|---|---|---|---|---|---|---|---|---|---|
| tcp | P7ECS* | Olathe | Linux | inbound | Unknown | Load Balancer Appliance | Unknown | Unknown | 176577 |
| tcp | P7ECS* | Olathe | Linux | outbound | Olathe | Performance Tools | HP Diagnostics/None/None | Linux | 75001 |
| tcp | P7ECS* | Olathe | Linux | outbound | Unknown | Unknown | Unknown | Unknown | 46806 |
| tcp | P7ECS* | Olathe | Linux | outbound | Olathe | Splunk data search software | Splunk/None/None | Linux | 26777 |
| tcp | P7ECS* | Olathe | Linux | outbound | EDCO(31) | Windows | Directory Services/AD Domain Controller/None | WS12 R2 | 16094 |
| tcp | P7ECS* | Olathe | Linux | outbound | Olathe | LifeCycle Tools | LifeCycle Tools/IBM UrbanCode/None | Linux | 15603 |
| tcp | P7ECS* | Olathe | Linux | outbound | Unknown | log-linux | Unknown | Unknown | 15519 |
| tcp | P7ECS* | Olathe | Linux | outbound | Unknown | Mainframe | Unknown | Unknown | 6722 |
| tcp | P7ECS* | Olathe | Linux | outbound | Unknown | Domain Name System (DNS) | Unknown | Unknown | 2053 |
| tcp | P7ECS* | Olathe | Linux | outbound | Unknown | puppet-std-prod-edco | Unknown | Unknown | 1110 |
| tcp | P7ECS* | Olathe | Linux | outbound | Unknown | Enterprise System Center (Command Center) | Unknown | Unknown | 416 |
| tcp | P7ECS* | Olathe | Linux | outbound | Unknown | b2emstriscc | Unknown | Unknown | 285 |
| tcp | P7ECS* | Olathe | Linux | outbound | ISC East | Enterprise System Center (Command Center) | OpenView/None/None | Linux | 206 |
| tcp | P7ECS* | Olathe | Linux | outbound | Unknown | sp-spkds-lb-prod-edco | Unknown | Unknown | 190 |
| tcp | P7ECS* | Olathe | Linux | outbound | Richardson | Performance Tools | Best1/None/None | Linux | 145 |
| tcp | P7ECS* | Olathe | Linux | inbound | Richardson | Performance Tools | Best1/None/None | Linux | 143 |

(Migration Schema – IAAS Migration)

| IAAS Migration | | | | | |
|---|---|---|---|---|---|
| MST_IAAS_PV_SERVER_STATUS_MAPPING | | | | | |
| **Field** | **Type** | **Null** | **Key** | **Default** | **Extra** |
| VAR_TEAM_NAME | varchar(500) | YES | | | |
| VAR_SERVER_NAME | varchar(500) | YES | UNI | | |
| VAR_SERVER_TYPE | varchar(700) | YES | | | |
| VAR_BUSINESS_AREA | varchar(700) | YES | | | |
| VAR_SERVER_LOCATION | varchar(500) | YES | | | |
| VAR_MICRO_STATUS | varchar(200) | YES | | | |
| VAR_PV_STATUS_BY_SRV | varchar(200) | YES | | | |
| VAR_ASSESMENT_START_DATE | varchar(50) | YES | | | |
| VAR_ASSESMENT_COMPLETE_DATE | varchar(50) | YES | | | |
| VAR_ENV_READY_DATE | varchar(50) | YES | | | |
| VAR_MIGRATION_COMPLETE_DATE | varchar(50) | YES | | | |
| VAR_RTS_COMPLETE_DATE | varchar(50) | YES | | | |
| VAR_REMARKS | mediumtext | YES | | | |
| VAR_SIZE | varchar(50) | YES | | | |
| VAR_IDX_TYPE | varchar(45) | YES | | | |
| UNQ_TRACKER_ID | int(11) unsigned | NO | PRI | | auto_increment |

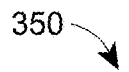

(Migration Schema – Windows 2012 Sunset)

| Windows 2012 Sunset<br>TXN_WINIAAS_SRV_MIG | | | | | |
|---|---|---|---|---|---|
| **Field** | **Type** | **Null** | **Key** | **Default** | **Extra** |
| UNQ_TRACKER_ID | int(11) | NO | PRI | | auto_increment |
| SERVER_ENVRMNT | varchar(100) | YES | | | |
| SERVER_NAME | varchar(200) | YES | | | |
| SERVER_TYPE | varchar(500) | YES | | | |
| DOMAIN_NAME | varchar(500) | YES | | | |
| OPERATING_SYSTEM | varchar(500) | YES | | | |
| HARDWARE_TYPE | varchar(500) | YES | | | |
| HOST_GROUP | varchar(200) | YES | | | |
| LOCATION | varchar(100) | YES | | | |
| PRIMARY_CONTACT | varchar(50) | YES | | | |
| SECONDARY_CONTACT | varchar(50) | YES | | | |
| TERTIARY_CONTACT | varchar(50) | YES | | | |
| GOVERNING_SERVICE | varchar(500) | YES | | | |
| BUSINESS_AREA | varchar(500) | YES | | | |
| WORKGROUP | varchar(100) | YES | | | |
| MIGRATION_STATUS | varchar(200) | YES | | | |
| REQ_DUE_DTT | varchar(50) | YES | | | |
| FA_BUILD_START_DTT | varchar(50) | YES | | | |
| FA_BUILD_CMPLT_DTT | varchar(50) | YES | | | |
| FB_BUILD_START_DTT | varchar(50) | YES | | | |
| FB_BUILD_CMPLT_DTT | varchar(50) | YES | | | |
| PROD_BUILD_START_DTT | varchar(50) | YES | | | |
| PROD_BUILD_CMPLT_DTT | varchar(50) | YES | | | |
| CUTOVER_DTT | varchar(50) | YES | | | |
| RTS_DTT | varchar(50) | YES | | | |
| FOLLOWUP_DTT | varchar(50) | YES | | | |
| REMARKS | mediumtext | YES | | | |
| X_DEPENDENCY | varchar(45) | YES | | | |
| FK_SERVER_TYPE_ID | int(11) | YES | MUL | | |

SYSTEMS AND METHODS FOR AUTOMATED DISCOVERY AND TRACKING OF A MIGRATION OF LEGACY NETWORKED RESOURCES WITHIN AN ENTERPRISE

CROSS REFERENCE TO RELATED APPLICATIONS

This application is a continuation that claims the benefit of U.S. application Ser. No. 16/743,835 (filed on Jan. 15, 2020), which is incorporated by reference herein in its entirety.

FIELD OF THE DISCLOSURE

The present disclosure generally relates to automated technical migration systems and methods, and, more particularly, to automated migration systems and methods for discovering and tracking a migration of legacy networked resources within a computer network environment of an enterprise.

BACKGROUND

Technical migration involves the transition of one technical platform or asset to another. A technical migration typically involves the upgrade of older hardware or software of an older technical platform to newer software or hardware of a newer technical platform. A technical migration may be undertaken because the older software or hardware has ended its shelf-life, is no longer supported by the manufacturer, or is otherwise no longer useful. For example, the older software or hardware may have served the needs of the company employing the older hardware or software. While the older hardware or software is typically removed or deleted, technical migrations generally seek to maintain useful assets of, or used by, an old technical platform for use with the new technical platform.

Problems can arise, however, during a technical migration due to different formats, protocols, security concerns, or other differences between the technology of older platforms and the technology of newer platforms. While transitioning a few assets of a small platform can be difficult in and of itself, transitioning many assets, such as several hundred or thousands of assets, of a larger system can be take years of planning and implementation. For example, a large-scale migration involving many systems, software applications, or assets can take years of planning and implementation in order to successfully accomplish. Migration difficulties can be greater where a completely redesigned technical environment and/or new technology or platform is brought into an existing technical environment, creating difficulties of merging connections, data, or other requirements of the old and new platform.

For these reasons, technical migrations, especially large-scale technical migrations, typically experience high error rates and/or at least a decrease capabilities or performance of the new technical platform, as bugs or other errors or exceptions may be experienced by newer technologies that rely on older assets that were not correctly migrated. In such large-scale migrations, various assets from different areas of a network, and in many instances as operated and/or maintained by different stakeholders of a given company or technical environment, need to be identified and transitioned by teams of individuals. This typically increases the complexity and timing of the technical migration. Teams of individuals are generally required to maintain and track progress separately, typically via simple electronic or paper documents. Such activity limits the ability of a migration team to realize an extensive report or overview of a technical migration for a given technical platform and any business area that relies upon it.

For the foregoing reasons, there is a need for automated systems and methods for discovering and tracking a migration of legacy networked resources within a computer network environment.

BRIEF SUMMARY

The embodiments of the disclosure herein relates to automated tracking and migration of technical platforms. The automated systems and methods described herein, regarding discovering and tracking a migration of legacy networked resources within a computer network environment, may be referred to, or belong as group to, a Migration Services Asset Tracking Tool (MSATT), or MSATT toolkit, providing solutions for all migration activities of a technical migration whether small or large scale. In various embodiments, the automated systems and methods described herein maintains a central repository of details of applications, servers, or other network resources across one or more technical platforms and/or business areas for use in technical migration. The automated systems and methods described herein provides a unique tracking tool platform that tracks migration activities and identifies resources network dependencies, both upstream and downstream, within a computer network environment or other such migration environment.

Generally, migration services provide infrastructure transformation activities including, but not limited to, migration, remediation, operating system (OS)/platform upgrades, and/or technical recovery. Migration services contributions include and/or apply to, for example, one or more of: data discovery enterprise assets (e.g., such as applications, servers, databases, appliances, infrastructure components, and/or the like); technical assessments; migration preparation; migration execution; and/or post migration activities such as return to stock. The MSATT toolkit provides an automated pull of structured data for specific migration effort. In some embodiments, the MSATT toolkit is provided via an interface to handle data, track status of each application (app), initiate assessment(s), and/or update review responses. In various embodiments, the MSATT toolkit is implemented as a reusable or plug-and-play component that can be used across various migration efforts with very minimal changes. The MSATT toolkit provides various benefits to technical migrations including automation, data reliability, cost reduction, and/or increases in productivity.

In various embodiments, the automated systems and methods described herein may be used to predict, forecast, or generate migration plan(s), which may include, for example, a migration plan for migrating from one version of a network resource, asset, or technology to another. As other another example, the automated systems and methods described herein may predict, forecast, or generate a migration plan, for migrating from a different resource, asset, or technology or to another, such as different version or different type of resource, asset, or technology or to another.

The automated systems and methods may comprise different tools or formats that can be used for different migration types. Such tools can include, for example, various trackers (e.g., an infrastructure-as-a-service (IAAS) tracker, a software application TP tracker, an SPS Tracker, etc.), migration simplification tools, cloud migration kit, and/or a GUI based migration tool. The tools may be comprised of several components, for example, migration schema formats as described herein. In addition, in various embodiments, the automated systems and methods described herein may provide GUI based applications capable of generating plants, overviews, and/or status reports of a migration of a technical platform and/or across business areas. The GUI based migration tools can operate on a user role basis (e.g., Admin, Team Member & Guest). In some embodiments, team members may be categorized based on business nature (TP2.0 Migration, IAAS Server Migration, SPS Migration, etc.).

In still further embodiments, automated systems and methods provide discovery of networked resources for technical migration. For example, the automated systems and methods provide computer scripted discovery and identification of technical resources (e.g., databases, servers, software, etc.) within an enterprise and/or networked environment during a migration. In some embodiments, the automated systems and methods may execute automated tools, instructions, or scripts (e.g., SPLUNK) using custom queries to pull data and information from a variety of legacy sources on a computer network. In various embodiments, the custom scripts are customized for a migration type. In some embodiments, the automated systems and methods may describe a RESTful API to pull the data and information across the variety of legacy networked resources. The data and information, such as network based dependency data, can be used to determine resources to be migrated, or resources to be replaced during migration, such as to a new or updated version or system. For example, the new or updated version or system may be a newer, cloud-based (IAAS) platform, migrated to from a traditional server or mainframe.

In additional embodiments, automation systems and methods provide reporting and status of a technical migration, including tracking and planning status of a technical migration. In such embodiments, automation systems and methods include features related to tracking multiple different types of migrations, including versioning, operating system, server, application, and hardware migrations. In various embodiments, one or more migration database schema formats are implemented or developed for each type of migration, wherein the database schema format specifies reporting and tracking data. In various embodiments, the disclosed automated systems and methods describe a GUI(s) that are operable to provide reports, status, or plans of a currently active technical migration(s).

In some aspects, the techniques described herein relate to an automated migration system configured to discover and track a migration of legacy networked resources within a computer network environment, the automated migration system including: a migration database defining a migration schema format of a migration type; a migration server communicatively coupled to the migration database and to a computer network including a plurality of online network resources; and a network resource discovery application (app) implemented on the migration server and configured with one or more predefined migration queries customized based on corresponding migration types, wherein the migration database defines a first migration schema format corresponding to a first migration type and a second migration schema format corresponding to a second migration type, wherein the first migration schema format defines a first format of data required for migration of a first legacy networked resource identified by the first migration type, and wherein in the second migration schema format defines a second format of data required for migration of a second legacy networked resource identified by the second migration type, the network resource discovery app configured, during an active migration session, to: execute a predefined migration query, as selected from the one or more predefined migration queries and based on either (1) the first migration type and the corresponding first migration schema format of the first migration type or (2) the second migration type and the corresponding second migration schema format of the first migration type, to discover a set of network dependencies of a legacy networked resource accessible on the computer network, the legacy networked resource defining a resource type corresponding to either the first migration type or the second migration type, and the predefined migration query, load, during the active migration session, dependency data representative of the discovered set of network dependencies into the migration database according to the first migration schema format or the second migration schema format, and predict, during the active migration session, a migration plan for a target migration network resource to be implemented on the computer network at a future time, the target migration network resource requiring access to the first dependency data or the second dependency data at the future time.

In some aspects, the techniques described herein relate to an automated migration method for discovering and tracking a migration of legacy networked resources within a computer network environment, the automated migration method including: execute, during an active migration session by a network resource discovery application (app) implemented on a migration server, a predefined migration query, as selected from one or more predefined migration queries and based on either (1) a first migration type and a corresponding first migration schema format of the first migration type or (2) a second migration type and a corresponding second migration schema format of the first migration type, to discover a set of network dependencies of a legacy networked resource accessible on the computer network, the legacy networked resource defining a resource type corresponding to either the first migration type or the second migration type, and the predefined migration query, wherein a migration database defines the first migration schema format corresponding to the first migration type and the second migration schema format corresponding to the second migration type, wherein the first migration schema format defines a first format of data required for migration of a first legacy networked resource identified by the first migration type, and wherein in the second migration schema format defines a second format of data required for migration of a second legacy networked resource identified by the second migration type, load, during the active migration session, dependency data representative of the discovered set of network dependencies into the migration database according to the first migration schema format or the second migration schema format, and predict, during the active migration session, a migration plan for a target migration network resource to be implemented on the computer network at a future time, the target migration network resource requiring access to the first dependency data or the second dependency data at the future time.

In some aspects, the techniques described herein relate to a tangible, non-transitory computer-readable medium storing instructions for discovering and tracking a migration of legacy networked resources within a computer network environment, that when executed by one or more processors of a migration server cause the one or more processors of the migration server to: execute, during an active migration session by a network resource discovery application (app) implemented on a migration server, a predefined migration query, as selected from one or more predefined migration queries and based on either (1) a first migration type and a corresponding first migration schema format of the first migration type or (2) a second migration type and a corresponding second migration schema format of the first migration type, to discover a set of network dependencies of a legacy networked resource accessible on the computer network, the legacy networked resource defining a resource type corresponding to either the first migration type or the second migration type, and the predefined migration query, wherein a migration database defines the first migration schema format corresponding to the first migration type and the second migration schema format corresponding to the second migration type, wherein the first migration schema format defines a first format of data required for migration of a first legacy networked resource identified by the first migration type, and wherein in the second migration schema format defines a second format of data required for migration of a second legacy networked resource identified by the second migration type, load, during the active migration session, dependency data representative of the discovered set of network dependencies into the migration database according to the first migration schema format or the second migration schema format, and predict, during the active migration session, a migration plan for a target migration network resource to be implemented on the computer network at a future time, the target migration network resource requiring access to the first dependency data or the second dependency data at the future time.

In accordance with the above, and with the disclosure herein, the present disclosure includes improvements in computer functionality or in improvements to other technologies at least because the embodiments herein describe, e.g., various migration types and migration schema formats that provide a customized platform that reduces the complexity, and, therefore memory and processor requirements of the disclose migration server(s) and migration database(s). This also provides flexibility to the disclosed server(s), which may be used to migrate any technologies with a minimum memory and processor fingerprint to the computer network. In this way, the automated migration systems and methods, as described herein, provide flexibility and efficiency to migration server(s) as a migration schema format and a related migration type may be generated, added, removed, or otherwise managed for each resource type computer network 115, and for a variety of resource types, even in real time, as the resource types are discovered or modified, thereby providing a tailored fit memory solution that that improves the memory allocation and usage of the migration server(s) 102. This thereby reduces the memory needs of the automated migration system 101 as a whole. That is, the present disclosure describes improvements in the functioning of the computer itself or "any other technology or technical field" because the speed, efficiency, or resource utilization of the migration server(s), as describe herein, are enhanced. This improves over the prior art at least because current migration systems use large, disparate, and network-wide resources to track network resources, which is not only inefficient from a timing perspective, but also from a resource gathering, implementation, and usage perspective to a computer network as a whole.

In further embodiments, the automated migration systems and methods of the present disclosure include a network resource discovery application (app) implemented on the migration server(s). In various embodiments, a first network resource discovery app may be configured with one or more predefined migration queries customized based on corresponding migration types (e.g., operating system type, etc.). In some embodiments, the automated migration systems and methods may further include a second network resource discovery app, which may operate in parallel or synchronous fashion to improve the speed and/or performance of discovering network resources as described herein, thereby improving the performance of the migration server(s) 102 as a whole.

The present disclosure includes effecting a transformation or reduction of a particular article to a different state or thing, e.g., executing predefined migration querie(s) to discover dependency data to generate a prediction, during an active migration session, of a migration plan for a target migration network resource to be implemented on a computer network at a future time, where the target migration network resource requires access to the dependency data at the future time.

The present disclosure further includes specific features other than what is well-understood, routine, conventional activity in the field, or adding unconventional steps that confine the claim to a particular useful application, e.g., executing predefined migration querie(s) to discover dependency data to generate a prediction, during an active migration session, of a migration plan for a target migration network resource to be implemented on a computer network at a future time, where the target migration network resource requires access to the dependency data at the future time.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2A illustrates an example predefined migration query in accordance with various embodiments disclosed herein.

FIGS. 2B and 2C illustrate example resource dependencies in accordance with various embodiments disclosed herein.

FIGS. 3A and 3B illustrate example migration schema formats in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

Figure 1:
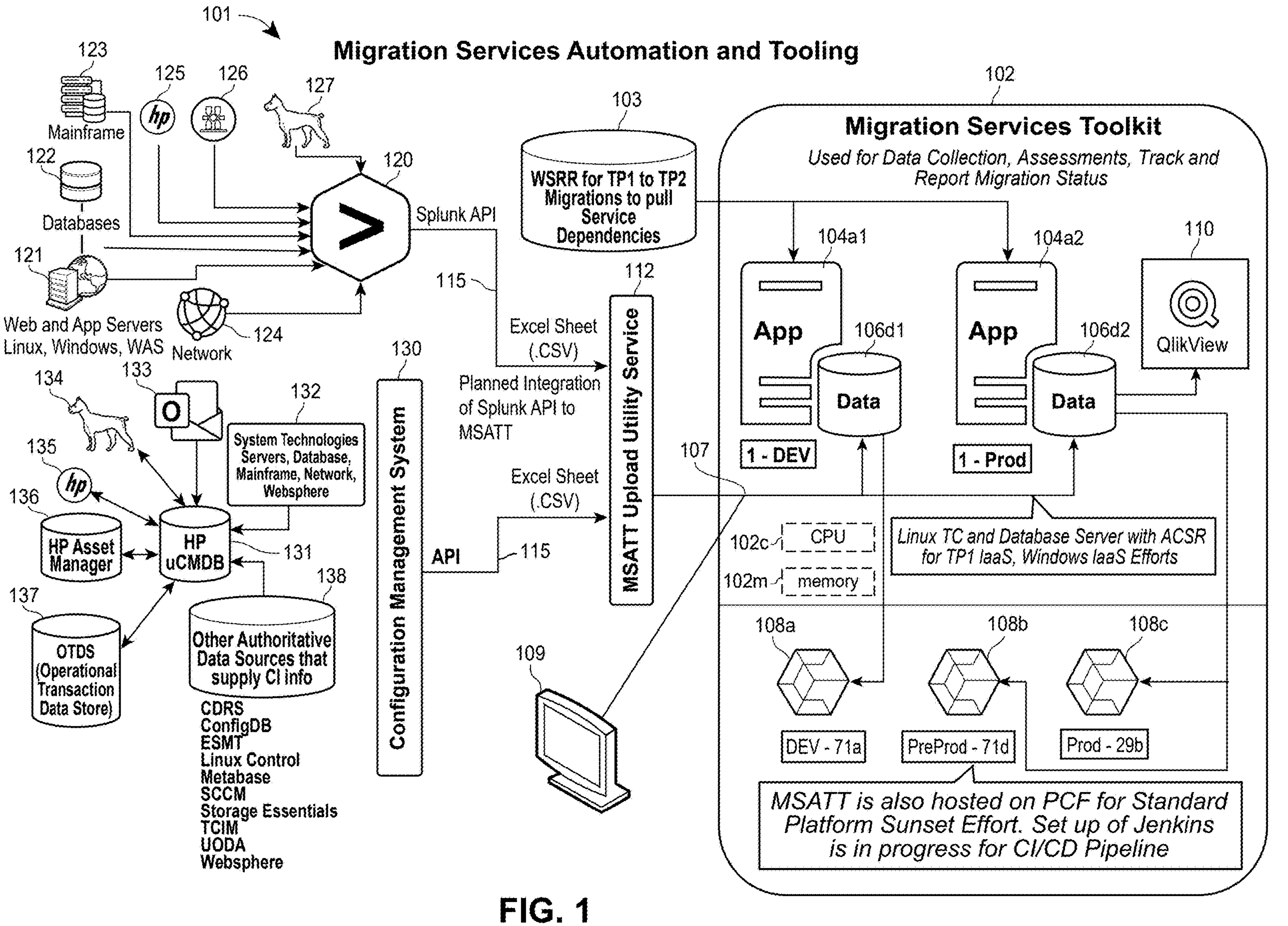
FIG. 1 illustrates an automated migration system in accordance with various embodiments disclosed herein.

FIG. 1 illustrates an automated migration system 101 in accordance with various embodiments disclosed herein. In the example embodiment of FIG. 1, automated migration system 101 includes server(s) 102, which may be referred to herein as "migration server(s)," and which may comprise one or more computer servers. The migration server(s) 102 may be communicatively coupled to migration databases **106*d*1 and/or 106*d*2 and to a computer network 115 comprising a plurality of online network resources (e.g., legacy networked resources 121 to 123 and/or 131 to 133) and/or non-legacy networked resources (e.g., non-legacy networked resources 124 to 127 and/or 134 to 138**) as described herein.

The migration server(s) 102 generally provide a variety of migration services as a "toolkit" of automated services that may be executed during technical migration(s) as described herein. In some embodiments, migration server(s) 102 may be implemented on Linux or Windows server(s). In addition, the migration server may implement, generate, or execute HTML, Java, JQuery, Ajax, Java Server Pages (JSP) on a TOMCAT Servlet container and/or SpringMVC framework, for example, to execute queries and/or generate web pages and/or GUIs, such as any GUIs or reports described herein.

In various embodiments, server(s) 102 comprise multiple servers, which may comprise multiple, redundant, or replicated servers as part of a server farm. For example, in the embodiment of FIG. 1, server(s) 102 are depicted with redundant systems. For example, network resource discovery app **104*a*1 and migration database 106*d*1 are depicted as implemented on a development server (e.g., of servers(s) 102), where network resource discovery app 104*a*2 and migration database 106*d*2 are depicted as implemented on a production server (e.g., of servers(s) 102**).

In some embodiments, server(s) 102 may be implemented as cloud-based servers. For example, server(s) 102 may be a cloud-based platform such as MICROSOFT AZURE, AMAZON AWS, or the like.

Server(s) 102 may include one or more processor(s) **102*c* as well as one or more computer memories 102*m*. The memories 102*m* may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memories 102*m* may store an operating system (OS) (e.g., Microsoft Windows, Linux, UNIX, etc.) capable of facilitating the functionalities, apps, methods, or other software as discussed herein. The memories 102*m* may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the resource discovery application or other apps described herein, where each are configured to facilitate their various functionalities discussed herein. It should be appreciated that one or more other applications may be envisioned and that are executed by the processor(s) 102*c***.

The processor(s) **102*c* may be connected to the memories 102*m* via a computer bus responsible for transmitting electronic data, data packets, or otherwise electronic signals to and from the processor(s) 102*c* and memories 102*m*** in order to implement or perform the machine readable instructions, methods, processes, elements or limitations, as illustrated, depicted, or described for the various flowcharts, illustrations, diagrams, figures, and/or other disclosure herein.

The processor(s) **102*c* may interface with the memory 102*m* via the computer bus to execute the operating system (OS). The processor(s) 102*c* may also interface with the memory 102*m* via the computer bus to create, read, update, delete, or otherwise access or interact with the data stored in the memories 102*m* and/or databases 106*d*1 and/or 106*d*2 (e.g., a relational database, such as ORACLE, DB2, MySQL, or a NoSQL based database, such as MongoDB). The data stored in the memories 102*m* and/or the databases 106*d*1 and/or 106*d*2** may include all or part of any of the data or information described herein, including, for example, the one or more search requests, the one or more transaction details, and the profile information of the user.

Server(s) 102 may further include a communication component configured to communicate (e.g., send and receive) data via one or more network port(s) (e.g., network port 107) to one or more networks or local terminals, such as computer network 115 and/or terminal 109 (for rendering or visualizing) as described herein. In some embodiments, server(s) 102 may include a client-server platform technology such as ASP.NET, Java J2EE, Ruby on Rails, Node.js, a web service or online API, responsive for receiving and responding to electronic requests. Server(s) 102 may implement client-server platform technology that may interact, via the computer bus, with the memories(s) **102*m* (including the applications(s), component(s), API(s), data, etc. stored therein) and/or databases 106*d*1 and/or 106*d*2 to implement or perform the machine readable instructions, methods, processes, elements or limitations, as illustrated, depicted, or described for the various flowcharts, illustrations, diagrams, figures, and/or other disclosure herein. According to some embodiments, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 115**.

Server(s) 102 may further include or implement an operator interface configured to present information to an administrator or operator and/or receive inputs from the administrator or operator. As shown in FIG. 1, an operator interface, or Guided User Interface (GUI), may provide a display screen (e.g., via terminal 109). Server(s) 102 may also provide I/O components (e.g., ports, capacitive or resistive touch sensitive input panels, keys, buttons, lights, LEDs), which may be directly accessible via or attached to server(s)

102 or may be indirectly accessible via or attached to terminal 109. According to some embodiments, an administrator or operator may access the server 102 via terminal 109 to review information, make changes, input training data, and/or perform other functions.

In general, a computer program or computer based product, or application, (e.g., the resource discovery application) in accordance with some embodiments may include a computer usable storage medium, or tangible, non-transitory computer-readable medium (e.g., standard random access memory (RAM), an optical disc, a universal serial bus (USB) drive, or the like) having computer-readable program code or computer instructions embodied therein, wherein the computer-readable program code or computer instructions may be installed on or otherwise adapted to be executed by processor(s) (e.g., processors 102*c* working in connection with the respective operating system in memories 102*m*) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, Actionscript, Javascript, HTML, CSS, XML, etc.).

In some embodiments, server(s) 102 may implement or include Pivotal Cloud Foundry (PCF) servers, including servers 108*a* (development level), 108*b* (pre-production level), and/or 108*c* (production level), for managing the automated migration system 101 external properties across various environments of computer network 115. For example, as a given network resource moves through the deployment pipeline from development to test and into production, the PCF server(s) 108*a* to 108*c*, as part of sever(s) 102, may be used to manage the configuration between environments to determine that a migrated resource has everything it needs (e.g., dependency data) to run when migrated.

In the embodiment of FIG. 1, automated migration system 101 may configured to discover and track a migration of legacy networked resources (e.g., legacy networked resources 121 to 123 and/or legacy networked resources 131 to 133) and/or non-legacy networked resources (e.g., non-legacy networked resources 124 to 127 and/or 134 to 138), within a computer network environment (e.g., of computer network 115). The computer network may be a computer network of a company or other such enterprise. For example, in various embodiments, computer network 115 may be a private network (e.g., local area network (LAN) or wide area network (WAN)) operating within a technical environment of an institution or company. In other embodiments, however, computer network 115 may be a public network. In still further embodiment, computer network 115 may be a virtual private network (VPN) implemented over a public network, such as the Internet.

In the embodiment of FIG. 1, the automated migration system 101 includes migration databases 106*d*1 and/or 106*d*2. Each of migration databases 106*d*1 and/or 106*d*2 may define migration schema format(s) of respective migration type(s). Migration schema format(s) and respective migration type(s) (e.g., as described herein for FIGS. 3A and 3B) generally correspond to the types of network resources (e.g., legacy networked resources 121 to 123 or and/or 131 to 133) involved in a technical migration. For example, a legacy and/or non-legacy networked resource may define a resource type corresponding to a migration type and a predefined migration query. A resource type may include, e.g., "an operating system type, where "WINDOWS 2012" is an example of an operating system type. In various embodiments, migration databases 106*d*1 and/or 106*d*2 are communicatively coupled to the migration server(s) 102 and the computer network 115, and may define a migration schema format of the migration type that corresponds to the resource type (e.g., "windows 2012") for migration.

Migration schema formats and migration types provide customization to automated migration system 101, allowing migration server(s) 102 to aggregate and streamline dependency data according to a migration schema format. In various embodiments, migration databases 106*d*1 and/or 106*d*2 may be configured with different migration schemas based on migration types. Migration types may include migrations of one software application to another and/or one hardware type to another. For example, migration types can include, for example, a server migration type (e.g., for a REDHAT based server migration to a MICROSOFT based server), a database migration type (e.g., for a IBM DB2 based database migration to an ORACLE based database), and an operating system migration type (e.g., for a WINDOWS 2012 based operating system migration to a WINDOWS 2018 based operating system). The various migration types and migration schema formats provide a customized technical solution, reducing the complexity, and, therefore the memory and processor requirements of migration server(s) 102 and migration database(s) 106*d*1 and/or 106*d*1. Such a solution also provides flexibility and may be used to migrate various technologies while utilizing a minimum memory and processor fingerprint on the computer network. In this way, the automated migration system 101 can provide both flexibility and efficiency to migration server(s) 102, as a migration schema format and a related migration type may be generated, added, removed, or otherwise managed for each resource type of computer network 115, and for a variety of resource types as the resource types are discovered or modified. This provides a tailored fit memory solution that that improves the memory allocation and usage of the migration server(s) 102, and therefore reduces the memory needs of the automated migration system 101 as a whole.

In the embodiment of FIG. 1, the automated migration system 101 includes a network resource discovery application (app) 104*a*1 implemented on the migration server(s) 102. In various embodiments, network resource discovery app 104*a*1 is configured with one or more predefined migration queries customized based on corresponding migration types (e.g., operating system type, etc.). Automated migration system 101 also includes network resource discovery app 104*a*2, which may be a production level version of network resource discovery app 104*a*1, and where network resource discovery app 104*a*1 may be a development level version. In some embodiments, however, network resource discovery app 104*a*1 and network resource discovery app 104*a*2 may be copies of one another (e.g., production versions), where each of resource discovery app 104*a*1 and network resource discovery app 104*a*2 may operate in parallel or in a synchronous fashion to improve the speed and/or performance of discovering network resources as described herein, thereby improving the performance of the migration server(s) 102 as a whole. As used herein, disclosure for discovery app 104*a*1 may apply equally for disclosure of discovery app 104*a*2, and vice versa. Similarly, disclosure for database 106*d*1 may apply equally for disclosure of database 106*d*2.

In the embodiment of FIG. 1, network resource discovery app 104*a*1 is configured, during an active migration session, to execute a predefined migration query, as selected from one or more predefined migration queries customized based on corresponding migration types (e.g., a server migration type, a database migration type, an operating system migration type, etc.). An active migration session any comprise a period where one technology (e.g., a first network resource), software and/or hardware, is being transitioned to another technology (e.g., a second network resource) within a network environment, or where assets of one technology (e.g., a third network resource), software and/or hardware, is being updated with, shared with, or moved to another technology (e.g., a fourth network resource) within a network environment. During an active migration session, predefined migration queries may be configured to discover a set of network dependencies of a legacy networked resource (e.g., legacy resource 121) accessible on a computer network (e.g., computer network 115) comprising a plurality of online network resources. Network dependencies may include, but are not limited by, any of e.g., resource dependencies, network dependencies, service traffic data, etc., as illustrated, for example, in FIG. 2B herein. Generally, predefined migration queries provide sets of data collection tools to collect data from various sources (e.g., network resources) to be stored in a centralized repository (e.g., migration database(s) 106*d*1 and/or 106*d*2).

In some embodiments, predefined migration queries may include SPLUNK based migration queries that access, or are based on, a SPLUNK application programing interface (API) 120. As shown in the embodiment of FIG. 1, the SPLUNK based queries are configured to discover network resources, including legacy networked resources 121 to 123 and/or non-legacy networked resources 124 to 127 of computer network 115, and/or related set(s) of dependencies and data thereof. In various embodiments, the set of set of network dependencies can include one or more software resources accessible on the computer network 115. For example, software based network resources may include any one or more of web/app servers, operating systems, or the like, such as operating system 121 (e.g., Linux or Windows), database 122 (e.g., IBM DB2 software), and software applications 125, 126, and 127. In addition, a set of network dependencies may include one or more hardware devices accessible on the computer network 115. For example, hardware network resources may include mainframe 123 and/or network 124 (e.g., network components, such as switches, routers, etc.). Generally, software and hardware network resources, or some combination thereof, may include or be application level dependencies (e.g., an app), object level dependencies (e.g., SOAP service), asset level dependencies (.css or .js files), database dependencies, REST dependencies, service dependencies, etc., each as executing on servers or other devices accessible on computer network 115.

In some embodiments, custom SPLUNK queries of SPLUNK API 120 (e.g., predefined migration queries) are used to discover software and/or hardware dependencies, e.g., online data sources, network services, databases, RESTful application programming interfaces (APIs), etc., which may be situated on or include any one or more of legacy networked resources 121 to 123 and/or non-legacy networked resources 124 to 127 of computer network 115.

For example, FIG. 2A illustrates an example predefined migration query 202 in accordance with various embodiments disclosed herein. Predefined migration query 202 may be selected from one or more predefined migration queries 200. In some embodiments, predefined migration query 202 may be newly added to predefined migration queries 200. The embodiment of FIG. 2A illustrates a SPLUNK based migration query that defines an "input lookup" query for a network resource as identified as "P7ECS." In the embodiment of FIG. 2A, predefined migration query 202, identified a network resource 212 ("ECSOnline-P7ECS01") has a cascading style sheet ("CSS") dependency 212*c*. For example, with respect to FIG. 1, network resource 212 may correspond to web/app server software and/or operating system 121 that depends on a CSS file (dependency 212*c*) for rendering a webpage or website hosted by web/app server software and/or operating system 121.

FIGS. 2B and 2C illustrate example resource dependencies in accordance with various embodiments disclosed herein. In particular FIG. 2B illustrates database resource dependencies 250. FIG. 2C illustrates network resource dependencies 280. Each of database resource dependencies 250 and network resource dependencies 280 may represent dependency data as discovered and/or pulled by predefined migration queries (e.g., SPLUNK based queries) for technical migration as describe herein. For example, database resource dependencies 250 of FIG. 2B may include dependency data 252, including dependency EAR (enterprise archive file) ("P7ECS01"), database host name ("SQLLPSSSS1 OPR STATEFARM.org"), db_name ("SFSQL_SESSIONSTATE"), and db_location ("8"), each of which may correspond to database 122 network resource of computer network 115 of FIG. 1. Database resource dependencies 250 may include additional dependency data as illustrated by FIG. 2B.

As a further example, network resource dependencies 280 of FIG. 2C includes dependency data 282, including protocol ("tcp"), enterprise archive (EAR) file ("PECS"), local location ("Olathe"), local operating system ("Linux), remote prefix description ("Mainframe"), etc., each of which may correspond to mainframe 123, a network resource of computer network 115 as shown for FIG. 1. Network resource dependencies 280 may include additional dependency data as illustrated by FIG. 2C.

Additionally or alternatively, predefined migration queries, as described herein, may include Configuration Management System (CMS) based migration queries that access, or are based on, a CMS application programing interface (API) 130. Generally, CMS is an application or API that can inventory software or hardware assets. With respect to the embodiment of FIG. 1, CMS API 130, and its related predefined migration queries, interact with a CMS database 131 to discover network resources, including legacy networked resources 131 to 133 and/or non-legacy networked resources 134 to 138 of computer network 115, and related set(s) of dependencies and data thereof. In various embodiments, the set of set of network dependencies can include one or more software resources accessible on the computer network 115. For example, software network resources may include application 133 (e.g., MICROSOFT OUTLOOK Exchange"), applications 134 and 135, and databases 136, 137, and 128 (e.g., HP Agent Manager, OTDS, etc.). In addition, a set of network dependencies may include one or more hardware devices accessible on the computer network 115. For example, hardware network resources may include mainframe 132. Generally, software and hardware network resources, or some combination thereof, may include or be application level dependencies (e.g., an app), object level dependencies (e.g., SOAP service), asset level dependencies (.css or .js files), database dependencies, REST dependencies, service dependencies, etc., each as executing on servers or other devices accessible on computer network 115.

In various embodiments, CMS related queries (e.g., of CMS API 130) and SPLUNK migration queries (e.g., of SPLUNK API 120, such as predefined migration query 202) may be used to discover, monitor, and/or sniff computer network 115 for network resources, e.g., any of legacy networked resources (e.g., legacy networked resources 121 to 123 or 131 to 133, or non-legacy resources 124 to 127 or 134 to 128), which can include by discovery, monitoring, sniffing traffic or network calls (e.g., MQ/queue calls). Additionally or alternatively, pre-defined SPLUNK or CMS queries may access RESTful API(s), which may discover and/or acquire dependency data from one or more online network resources. In some embodiments, SPLUNK or CMS queries may prepopulate dependencies automatically based on what is coded in a predefined, custom script, such as a SPLUNK or CMS custom scripts/queries. In other embodiments, dependency data and/or resource status data may be input manually. It is to be understood that the SPLUNK and CMS migration queries are provided as examples, and additional predefined migration queries based on other APIs or software may be used in accordance with the disclosure herein.

In some embodiments, server(s) 102 and/or network resource discovery app **104*a*1 may include or access a data analyzer capable of identifying dependency data. For example, the data analyzer may determine that discovered data (e.g., dependency data) is upstream or downstream data of a particular network resource in computer network 115. The data analyzer may determine, for example, upstream or downstream dependency data based on a location or positioning of a network resource's location within computer network 115** relative to other network resources. In various embodiments, migration complexity, migration plans or forecasts, as describe herein, can be determined, generated, or otherwise derived based on the dependencies.

In various embodiments, automated migration system 101, by execution of network resource discovery app **104*a*1 and/or predefined migration queries, is configured to discover downstream and/or upstream dependency relationships between or among network resources of computer network 115. For example, in some embodiments, a predefined migration query, as executed by discovery app 104*a*1 and/or migration servers(s) 102, may be configured to discover a downstream network resource (e.g., database 122) of a legacy networked resource (e.g., operating system 121). For example, as shown in FIG. 1, the downstream network resource (e.g., database 122) is downstream on computer network 115 to the legacy networked resource (operating system 121) and is accessible on the computer network 115 to the legacy networked resource (e.g., operating system 121). Operating system 121 may be a legacy networked resource because it is an operating system (e.g., "Windows 2012") where manufacturer support (by MICROSOFT) may be scheduled to be discontinued. In such an embodiment, a predefined migration query may be configured to determine that the downstream network resource (e.g., database 122) is a downstream dependency as accessed by legacy networked resource (e.g., operating system 121). For example, operating system 121 may access data from, and, therefore depend on database 122**.

Similarly, in some embodiments, a predefined migration query, as executed by migration servers(s) 102, may be configured to discover an upstream network resource (e.g., CMS database 131) of a legacy networked resource (e.g., application 133 (e.g., MICROSOFT OUTLOOK Exchange")). Application 133 may be a legacy networked resource because it is an older version (e.g., older version of OUTLOOK) where manufacturer support (e.g., by MICROSOFT) for the particular version is scheduled to be discontinued, thereby, creating the need to migrate to a new version or other software platform. As shown in FIG. 1, the upstream network resource (e.g., CMS database 131) is upstream on the computer network to the legacy networked resource (e.g., application 133). The upstream network resource (e.g., CMS database 131) is configured to access, or receive data from, the legacy networked resource (e.g., application 133) on the computer network 155. In such an embodiment, a predefined migration query is configured to determine that the upstream network resource (e.g., CMS database 131) has an upstream dependency on the legacy networked resource (e.g., application 133).

In various embodiments, server(s) 102 and/or network resource discovery app **104*a*1 may be configured to load, during an active migration session, dependency data representative of discovered set(s) of network dependencies into a migration database (e.g., migration database 106*d*1) according to a migration schema format as described herein. For example, as shown in FIG. 1, predefined migration queries may discover, pull and/or aggregate dependency data (e.g., upstream and/or downstream) or other data from the online network resources (e.g., legacy networked resources 121 to 123 or and/or 132 to 133) and/or non-legacy networked resources (e.g., non-legacy networked resources 124 to 127 and/or 134 to 138) for ingestion or storage into migration database(s) 106*d*1 and/or 1062**.

In some embodiments, the dependency data or other data pulled or discovered by predefined migration queries may be uploaded or otherwise provided via excel spreadsheet (.csv) format, which may then be uploaded or provided to database(s) **106*d*1 and/or 1062 by an upload utility service 112. In some embodiments, for example, upload utility service 112** may be a RESTful web service.

In some embodiments, as shown in FIG. 1, network resource discovery app **104*a*1, may use a registry and/or repository database (e.g., database 103**, which may be an IBM WESPHERE Service Registry and Repository) to discover, pull, or otherwise retrieve and store dependency data.

In some embodiments, the migration server is configured to export a listing of network dependencies of one or more discovered legacy networked resources. For example, such a listing may include a spreadsheet (e.g., "Master Tracker") showing current discovered legacy networked resources and their related dependencies.

In various embodiments, the automated system 101 and/or migration server(s) 102 may generate, predict, and/or forecast, based on the dependency data or other data as pulled, discovered, and/or aggregated by network resource discovery app **104*a*1 and/or migration database(s) 106*d*1 and/or 1062, a migration plan for a target migration network resource to be implemented on computer network 115. The target migration network resource may requiring access to the dependency data at the future time. For example, a new or target operating system (e.g., "Windows 2019") may be a target migration network resource to be implemented on the computer network 115 at a future time (e.g., at a time when the migration is complete or before Windows 2012 is no longer supported). The target migration network resource may require access to the dependency data (e.g., databased data of database 122**) at the future time.

A migration plan can be generated and provided by server(s) 102 at any point in time, including in real time or near real time, to reflect a current status or plan based on recently or currently discovered data. In this, way the migration plan can be updated routinely to provide a high level of accuracy and tracking for the technical migration.

In some embodiments, network resource discovery app **104*a*1 may further be configured to execute a second predefined migration query, as selected from the one or more predefined migration queries. The second predefined migration query may be executed to discover a second set of network dependencies of a non-legacy networked resource (e.g., application 125) accessible on computer network 115. The non-legacy networked resource may define a second resource type (e.g., HEWLETT PACKARD (HP) resource) corresponding to a second migration type (as defined in database(s) 106*d*1 and/or 1062 for application 125) and the second predefined migration query. Generally, a non-legacy networked resource may be a network resource that is not currently planned for removal or discontinued use on computer network 115. In such embodiments, network resource discovery app 104*a*1 is further configured to load, during the active migration session, the second dependency data representative of the discovered second set of network dependencies into database(s) 106*d*1 and/or 1062 according to a second migration schema format. In addition, in some embodiments, network resource discovery app 104*a*1 may further configured to update, during the active migration session, the migration plan for the target migration network resource (e.g., "Windows 2019") to be implemented on the computer network at the future time where the target migration network resource requires access to the second dependency data at the future time. For example, in some embodiments, Windows 2019 may depend on data or other resources from application 125** to operate in a newly migrated technical environment once a technical migration involving moving to Windows 2019 is completed (or in some embodiments while a technical migration is currently ongoing).

FIGS. 3A and 3B illustrate example migration schema formats 300 and 350 in accordance with various embodiments disclosed herein. For example, automated migration system 101 includes migration databases **106*d*1 and/or 106*d*2. Each of migration databases 106*d*1 and/or 106*d*2 may define migration schema formats 300 and 350** that each define different migration types.

As illustrated for FIG. 3A, migration schema format 300 defines a server based, and/or infrastructure-as-a-service (IAAS) based, migration type. The migration schema format 300 may represent or be a server migration type of a network resource defining a resource type. For example, the migration schema format 300 may represent or be a server migration type of a network resource (e.g., mainframe 132) defining a resource type (e.g., of a REDHAT based server or mainframe), as illustrated by FIGS. 1 and 3A. As illustrated by FIG. 3A, migration schema format 300 includes or defines various data related to a technical migration of a server migration type. For example, as illustrated, migration schema format 300 includes a resource type data 302 ("VAR_SERVER_TYPE") which may define, or otherwise indicate, that mainframe 132 is a REDHAT based server or mainframe. In addition, as illustrated by FIG. 3A, migration schema format 300 includes or defines status data 304 ("VAR_MIGRATION_COMPLETE_DATE"), which may define or otherwise indicate a migration completion date or expected/target migration completion date for migrating a network resource (e.g., mainframe 132), e.g., from one server type to another (e.g., for a REDHAT based server migration to a MICROSOFT based server), within the computer network 115 or otherwise a computer network environment during a technical migration.

In some embodiments, the migration schema format 300 may represent, define, or at least include information regarding, a target migration network resource (not shown) to be implemented on the computer network at a future time. For example, in the embodiment of FIG. 3A, the target migration network resource may be a MICROSOFT based server, where mainframe 132, and/or its data, dependencies, dependency data, or otherwise resources are to be migrated from the original resource type (e.g., from existing REDHAT based server or mainframe 132) to a target migration network resource. In various embodiments, the target migration network resource (e.g., the MICROSOFT based server) may require access to the dependency data or other resources at the future time.

FIG. 3B provides an additional example migration schema format 350. As illustrated for FIG. 3B, migration schema format 350 defines an operating system based migration type, e.g., regarding "Windows 2012." The migration schema format 350 may represent or be an operating system migration type of a network resource defining a resource type. For example, the migration schema format 350 may represent or be an operating system migration type of a network resource (e.g., operating system 121) defining a resource type (e.g., "Windows 2012" as running on a server), as illustrated by FIGS. 1 and 3B. As illustrated by FIG. 3B, migration schema format 350 includes or defines various data related to a technical migration of an operating system migration type. For example, as illustrated, migration schema format 350 includes operating system type data 354 ("OPERATING_SYSTEM") which may define, or otherwise indicate, that operating system 121 is a WINDOWS 2012 based operating system. In addition, as illustrated by FIG. 3B, migration schema format 350 includes or defines server type data 352 ("SERVER_TYPE"), which may define or otherwise include data indicating the type of server (e.g., which is another type of network resource) that operating system 121 runs on.

In addition, as illustrated by FIG. 3B, migration schema format 350 includes or defines status data 356 ("MIGRATION_STATUS"), which may define or otherwise include a migration status (e.g., "51% complete" or "mid-stage") for migrating a network resource (e.g., operating system 121), e.g., from one operating system type to another (e.g., for a WINDOWS 2012 based operating system migration to a WINDOWS 2018 based operating system), within the computer network 115 or otherwise a computer network environment during a technical migration.

In some embodiments, the migration schema format 350 may represent, define, or at least include information regarding, a target migration network resource (not shown) to be implemented on the computer network at a future time. For example, in the embodiment of FIG. 3B, the target migration network resource may be an updated MICROSOFT WINDOWS operating system (e.g., WINDOWS 2018), where operating system 121, and/or its data, dependencies, dependency data, or otherwise resources are to be migrated from the original resource type (e.g., from existing operating system 121, e.g., WINDOWS 2012). In various embodiments, the target migration network resource (e.g., WINDOWS 2018) may require access to the dependency data or other resources at the future time. In such embodiments, dependency data, as described herein, may be defined or otherwise included by migration schema format 350 and/or databases **106*d*1/106*d*2. For example, as illustrated by FIG. 3B, dependency data 358** may define dependency data that the target migration network resource (e.g., WINDOWS 2018) may utilize or otherwise depend on during and/or upon completion of a technical migration.

Figure 4A:
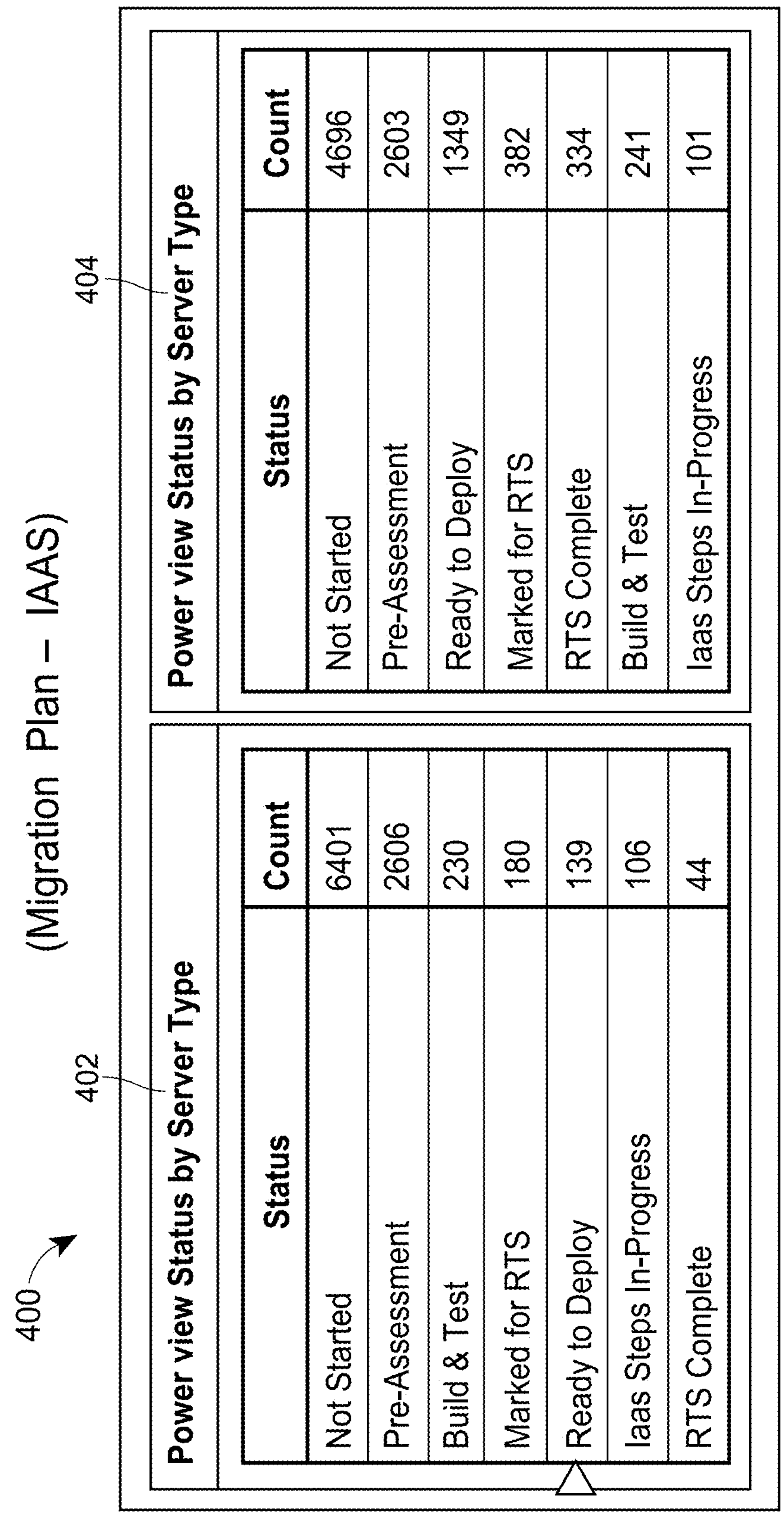
FIGS. 4A and 4B illustrate example migration plans in accordance with various embodiments disclosed herein.
Figure 4B:
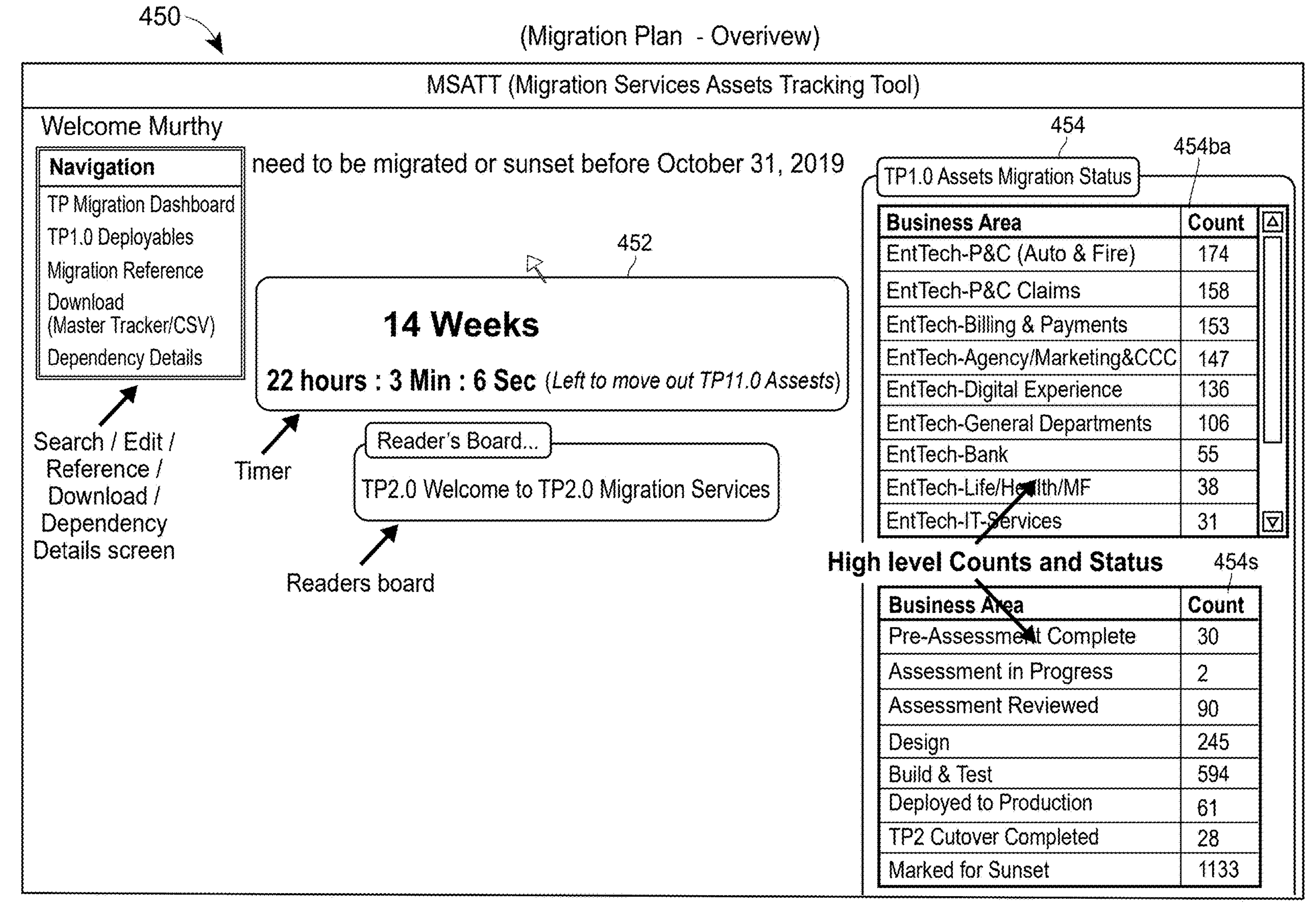

FIGS. 4A and 4B illustrate example migration plans 400 and 450 in accordance with various embodiments disclosed herein. For example, migration plan 400 of FIG. 4A is implemented as a GUI-based migration dashboard that provides real time reporting and migration plan data regarding migration status. For example, in the embodiment of FIG. 4A, the GUI-based migration dashboard of migration plan 400 illustrates an IAAS based migration plan, which may correspond to migration schema format 300, defining a server based, and/or infrastructure-as-a-service (IAAS) based, migration type, as described for FIG. 3A herein. Migration plan 400 defines or otherwise includes status of various IAAS servers based on server type 402 and server 404. For example, migration plan 400, via its GUI-based migration dashboard, may indicate how many server types 402 and/or actual servers 404 have not started, are in a pre-assessment stage, are in a Build & Test stage, etc. Such data and status, which in various embodiments can be discovered and/or displayed in real time or near real time, can be used to plan a migration for one or more target migration network resource(s) to be implemented on the computer network 115 as described herein. In some embodiments, the data or status can be modified at any point of time, for example, with the GUI-based migration dashboard or by executing and/or re-executing the predefined migration queries as described herein to provide up to date and/or real time reporting of the technical migration.

In the embodiment of FIG. 4B, migration plan 450 is implemented as a GUI-based migration dashboard that provides real time reporting and plan data on migration status. In the embodiment of FIG. 4B, the GUI-based migration dashboard of migration plan 450 illustrates an application based migration plan (e.g., an application TP 1.0 to an application TP 2.0), which may correspond to an application as network resource (e.g., any of application 125, 126, and/or 127 of FIG. 1)). Migration plan 450 defines or otherwise includes status of the application based migration. For example, migration plan 450, via its GUI-based migration dashboard, indicates a remaining time 452 for a planned migration and a date for the migration (e.g., that the application needs to be migrated or sunset before "Oct. 31, 2019"). Migration plan 450 further includes a migration status 454 regarding the various assets, dependencies, and/or other data of migrating asset(s) that a target migration network resource(s) may need. For example, migration plan 450, via its GUI-based migration dashboard, may indicate migration status 454*s* of application features or parameters as they exist in various pre-assessment stages, Build & Test stage(s), etc. In addition, migration plan 450 indicates various business areas 454*ba* to which the various assets, dependencies, and/or other data belong or are otherwise assigned to. The business areas 454*ba* may be used as further metrics by which to track or plan a technical migration. In particular, such data and status, which in various embodiments can be displayed in real time or near real time, can be used to plan a migration for one or more target migration network resource(s) to be implemented on the computer network 115 as described herein. In some embodiments, the data or status can be modified at any point of time, for example, in real time or near real time, with the GUI-based migration dashboard of FIG. 4B or by executing and/or re-executing the predefined migration queries as described herein to provide up to date and/or real time reporting of the technical migration.

GUI-based migration dashboards of FIGS. 4A and 4B may be rendered or displayed via terminal 109 and/or view 110, which may be, in some embodiments, a web page or mobile app.

Figure 5A:
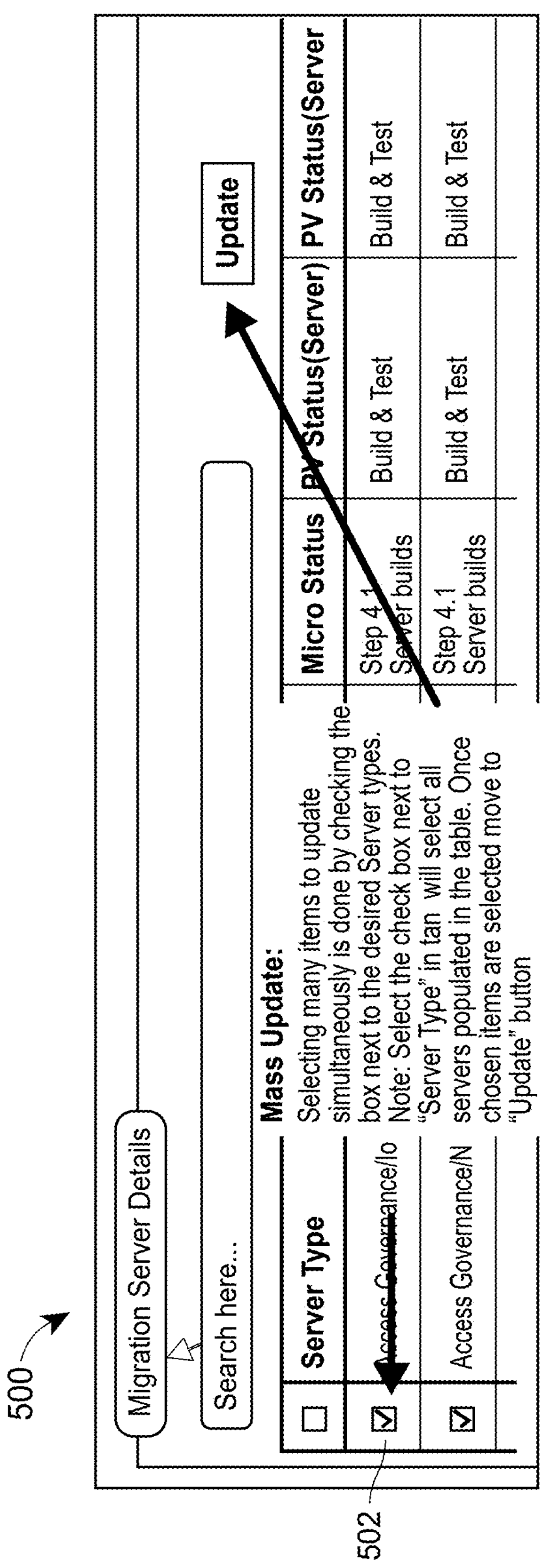
FIGS. 5A and 5B illustrate example guided user interface (GUI) migration update screens in accordance with various embodiments disclosed herein.
Figures 5B, 6:
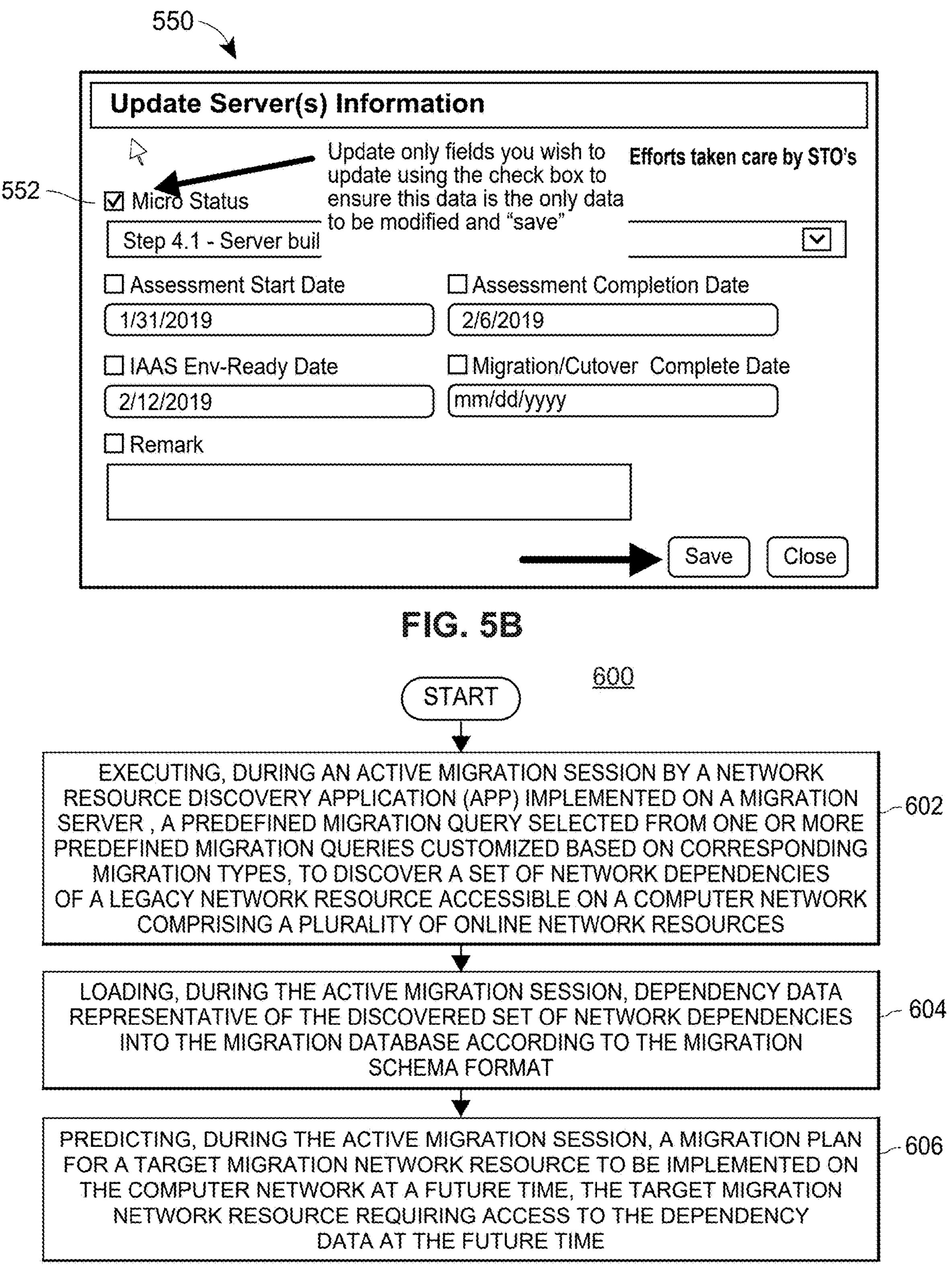
FIG. 6 illustrates an example automated migration method for discovering and tracking a migration of legacy networked resources within a computer network environment in accordance with various embodiments disclosed herein.

FIGS. 5A and 5B illustrate example guided user interface (GUI) migration update screens 500 and 550 in accordance with various embodiments disclosed herein. GUI migration update screen 500 provides the ability to update multiple items simultaneously. For example, as shown in FIG. 5A, GUI migration update screen 500 shows various servers or mainframes (e.g., mainframe 132) and their related server types (e.g., resource types) for technical migration. In the embodiment of FIG. 5A, as illustrated, to the left of every server type is a check box, e.g., check box 502. Checking a box indicates which servers to update information for. Once all servers/servers types are selected an "update" button may be selected to initiate an update process for updating server data, dependency data, or other such data or information as described herein.

For example, with respect to the embodiment of FIG. 5A, migration update screen 500 may be configured to receive an update request (e.g., via update button) corresponding to a legacy networked resource (e.g., mainframe 132) and a migration type (e.g., IAAS). The update request may cause a network resource discovery app (e.g., network resource discovery application app 104*a*1 and/or 104*a*2) to execute or re-execute a predefined migration query (e.g., at a second time) to discover an additional set of network dependencies, as updated information, of the legacy networked resource (e.g., mainframe 132) accessible on the computer network (e.g., resource type computer network 115). In such embodiments, the discovery of the additional set of network dependencies may cause the network resource discovery app (e.g., network resource discovery application app 104*a*1 and/or 104*a*2) to load, during an active migration session, dependency data representative of the discovered additional set of network dependencies into a migration database (e.g., database s 106*d*1 and/or migration database 106*d*2) according to the migration schema format (e.g., migration schema format 300) of the resource type (e.g., a server resource).

As illustrated in the embodiment of FIG. 5B, a network resource (e.g., a server) may be individually updated with status or other data. For example, GUI migration update screen 550 may be used to update a micro status 552 of a server or mainframe to "Step 4.1—Server build," indicating that the server status is in a building or development stage. Such information may be used to update the status data, dependency data, GUIs, or other such data or screens as described herein.

FIG. 6 illustrates an example automated migration method 600 or algorithm for discovering and tracking a migration of legacy networked resources within a computer network environment in accordance with various embodiments disclosed herein. At block 602, automated migration method 600 includes executing, during an active migration session by a network resource app (e.g., network resource discovery application app 104*a*1) implemented on a migration server (e.g., server(s) 102), a predefined migration query (e.g., predefined migration query 202) selected from one or more predefined migration queries (e.g., predefined migration queries 200) customized based on corresponding migration types (e.g., of FIGS. 3A and 3B as described herein).

The predefined migration query may be configured to discover a set of network dependencies (e.g., database resource dependencies 250 and/or network resource dependencies 280) of a legacy networked resource (e.g., database 122 network resource and/or mainframe 123 network resource) accessible on a computer network (e.g., computer network 115) comprising a plurality of online network resources (e.g., legacy networked resources 121 to 123 and/or 131 to 133) and/or non-legacy networked resources (e.g., non-legacy networked resources 124 to 127 and/or 134 to 138).

In various embodiments, as described herein, the legacy networked resource (e.g., database 122 network resource and/or mainframe 123 network resource) may define a resource type (e.g., database type or server type) corresponding to a migration type (e.g., IBM DB2) and the predefined migration query for discovery and/or information gather corresponding to those specific types. In addition, a migration database (e.g., migration databases 106*d*1 or 106*d*2), communicatively coupled to the migration server (e.g., server(s) 102) and the computer network (e.g., resource type computer network 115), may define a migration schema format (e.g., migration schema format 300 and/or 350) of the migration type.

At block 604, automated migration method 600 includes loading, during the active migration session, dependency data representative of the discovered set of network dependencies (e.g., database resource dependencies 250 and/or network resource dependencies 280) into the migration database (e.g., migration databases 106*d*1 or 106*d*2) according to the migration schema format (e.g., migration schema format 300 and/or 350).

At block 606, automated migration method 600 includes predicting, forecasting, or tracking, during the active migration session, a migration plan (e.g., migration plans 400 and/or 450) for a target migration network resource (e.g., WINDOWS 2018) to be implemented on the computer network (e.g., computer network 115) at a future time. For example, in the embodiment of FIG. 4B, migration plan 450 set a future ("sunset") time of before "Oct. 31, 2019" for migrating an software based network resource (e.g., a "TP 1.0" application) to a target migration network resource (e.g., a "TP 2.0" application). In such embodiments, the target migration network resource may require access to the dependency data of the legacy resource at the future time. For example, the TP 2.0 application may require network links or other decency data that the TP 1.0 application relied upon or relies upon in order to function within computer network 115.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An automated migration system configured to discover and track a migration of legacy networked resources within a computer network environment, the automated migration system comprising:

a migration database defining a migration schema format of a migration type;

a migration server communicatively coupled to the migration database and to a computer network comprising a plurality of online network resources; and a network resource discovery application (app) implemented on the migration server and configured with one or more predefined migration queries customized based on corresponding migration types, wherein the migration database defines a first migration schema format corresponding to a first migration type and a second migration schema format corresponding to a second migration type, wherein the first migration schema format defines a first format of data required for migration of a first legacy networked resource identified by the first migration type, and wherein in the second migration schema format defines a second format of data required for migration of a second legacy networked resource identified by the second migration type, the network resource discovery app configured, during an active migration session, to:

execute a predefined migration query, as selected from the one or more predefined migration queries and based on either (1) the first migration type and the corresponding first migration schema format of the first migration type or (2) the second migration type and the corresponding second migration schema format of the first migration type, to discover a set of network dependencies of a legacy networked resource accessible on the computer network, the legacy networked resource defining a resource type corresponding to either the first migration type or the second migration type, and the predefined migration query, load, during the active migration session, dependency data representative of the discovered set of network dependencies into the migration database according to the first migration schema format or the second migration schema format, and predict, during the active migration session, a migration plan for a target migration network resource to be implemented on the computer network at a future time, the target migration network resource requiring access to the dependency data at the future time.

2. The automated migration system of claim 1, wherein the predefined migration query is configured to discover a downstream network resource of the legacy networked resource.

3. The automated migration system of claim 2, wherein the downstream network resource is downstream on the computer network to the legacy networked resource and is accessible on the computer network to the legacy networked resource, and wherein the predefined migration query is configured to determine that the downstream network resource is a downstream dependency as accessed by legacy networked resource.

4. The automated migration system of claim 1, wherein the predefined migration query is configured to discover an upstream network resource of the legacy networked resource.

5. The automated migration system of claim 4, wherein the upstream network resource is upstream on the computer network to legacy networked resource and is configured to access the legacy networked resource on the computer network, and wherein the predefined migration query is configured to determine that the upstream network resource has an upstream dependency on the legacy networked resource.

6. The automated migration system of claim 1 further comprising a guided user interface (GUI) migration update screen, the GUI migration update screen configured to receive an update request corresponding to the legacy networked resource and the migration type, wherein the update request causes the network resource discovery app to re-execute the predefined migration query at a second time to discover an additional set of network dependencies of the legacy networked resource accessible on the computer network.

7. The automated migration system of claim 6, wherein discovery of the additional set of network dependencies causes the network resource discovery app to load, during the active migration session, dependency data representative of the discovered additional set of network dependencies into the migration database according to the migration schema format of the resource type.

8. The automated migration system of claim 1, wherein the network resource discovery app is further configured to execute a second predefined migration query, as selected from the one or more predefined migration queries, to discover a second set of network dependencies of a non-legacy networked resource accessible on the computer network, the non-legacy networked resource defining a second resource type corresponding to a second migration type and the second predefined migration query, wherein network resource discovery app is further configured to load, during the active migration session, second dependency data representative of the discovered second set of network dependencies into the migration database according to a second migration schema format, and wherein network resource discovery app is further configured to update, during the active migration session, the migration plan for the target migration network resource to be implemented on the computer network at the future time, the target migration network resource requiring access to the second dependency data at the future time.

9. The automated migration system of claim 1, wherein the migration server is configured to export a listing of network dependencies of one or more discovered legacy networked resources.

10. The automated migration system of claim 1, wherein the set of network dependencies comprises one or more software resources accessible on the computer network.

11. The automated migration system of claim 1, wherein the set of network dependencies comprises one or more devices accessible on the computer network.

12. An automated migration method for discovering and tracking a migration of legacy networked resources within a computer network environment, the automated migration method comprising:

execute, during an active migration session by a network resource discovery application (app) implemented on a migration server, a predefined migration query, as selected from one or more predefined migration queries and based on either (1) a first migration type and a corresponding first migration schema format of the first migration type or (2) a second migration type and a corresponding second migration schema format of the first migration type, to discover a set of network dependencies of a legacy networked resource accessible on the computer network, the legacy networked resource defining a resource type corresponding to either the first migration type or the second migration type, and the predefined migration query, wherein a migration database defines the first migration schema format corresponding to the first migration type and the second migration schema format corresponding to the second migration type, wherein the first migration schema format defines a first format of data required for migration of a first legacy networked resource identified by the first migration type, and wherein in the second migration schema format defines a second format of data required for migration of a second legacy networked resource identified by the second migration type, load, during the active migration session, dependency data representative of the discovered set of network dependencies into the migration database according to the first migration schema format or the second migration schema format, and predict, during the active migration session, a migration plan for a target migration network resource to be implemented on the computer network at a future time, the target migration network resource requiring access to the dependency data at the future time.

13. The automated migration method of claim 12, wherein the predefined migration query is configured to discover a downstream network resource of the legacy networked resource.

14. The automated migration method of claim 13, wherein the downstream network resource is downstream on the computer network to the legacy networked resource and is accessible on the computer network to the legacy networked resource, and wherein the predefined migration query is configured to determine that the downstream network resource is a downstream dependency as accessed by legacy networked resource.

15. The automated migration method of claim 12, wherein the predefined migration query is configured to discover an upstream network resource of the legacy networked resource.

16. The automated migration method of claim 15, wherein the upstream network resource is upstream on the computer network to legacy networked resource and is configured to access the legacy networked resource on the computer network, and wherein the predefined migration query is configured to determine that the upstream network resource has an upstream dependency on the legacy networked resource.

17. The automated migration method of claim 12 further comprising a guided user interface (GUI) migration update screen, the GUI migration update screen configured to receive an update request corresponding to the legacy networked resource and the migration type, wherein the update request causes the network resource discovery app to re-execute the predefined migration query at a second time to discover an additional set of network dependencies of the legacy networked resource accessible on the computer network.

18. The automated migration method of claim 17, wherein discovery of the additional set of network dependencies causes the network resource discovery app to load, during the active migration session, dependency data representative of the discovered additional set of network dependencies into the migration database according to the migration schema format of the resource type.

19. The automated migration method of claim 12, wherein the network resource discovery app is further configured to execute a second predefined migration query, as selected from the one or more predefined migration queries, to discover a second set of network dependencies of a non-legacy networked resource accessible on the computer network, the non-legacy networked resource defining a second resource type corresponding to a second migration type and the second predefined migration query, wherein network resource discovery app is further configured to load, during the active migration session, second dependency data representative of the discovered second set of network dependencies into the migration database according to a second migration schema format, and wherein network resource discovery app is further configured to update, during the active migration session, the migration plan for the target migration network resource to be implemented on the computer network at the future time, the target migration network resource requiring access to the second dependency data at the future time.

20. A tangible, non-transitory computer-readable medium storing instructions for discovering and tracking a migration of legacy networked resources within a computer network environment, that when executed by one or more processors of a migration server cause the one or more processors of the migration server to:

execute, during an active migration session by a network resource discovery application (app) implemented on a migration server, a predefined migration query, as selected from one or more predefined migration queries and based on either (1) a first migration type and a corresponding first migration schema format of the first migration type or (2) a second migration type and a corresponding second migration schema format of the first migration type, to discover a set of network dependencies of a legacy networked resource accessible on the computer network, the legacy networked resource defining a resource type corresponding to either the first migration type or the second migration type, and the predefined migration query, wherein a migration database defines the first migration schema format corresponding to the first migration type and the second migration schema format corresponding to the second migration type, wherein the first migration schema format defines a first format of data required for migration of a first legacy networked resource identified by the first migration type, and wherein in the second migration schema format defines a second format of data required for migration of a second legacy networked resource identified by the second migration type, load, during the active migration session, dependency data representative of the discovered set of network dependencies into the migration database according to the first migration schema format or the second migration schema format, and predict, during the active migration session, a migration plan for a target migration network resource to be implemented on the computer network at a future time, the target migration network resource requiring access to the dependency data at the future time.

* * * * *